United States Patent [19]

Radler, Jr.

[11] 4,045,413

[45] Aug. 30, 1977

[54] POSSIBLE ACTIVE MATRIX POLYMERS

[75] Inventor: Richard W. Radler, Jr., Marion, N.Y.

[73] Assignee: Xerox Corporation, Stamford, Conn.

[21] Appl. No.: 516,066

[22] Filed: Oct. 21, 1974

Related U.S. Application Data

[62] Division of Ser. No. 401,468, Sept. 27, 1973, Pat. No. 3,884,690.

[51] Int. Cl.$^2$ .................. C08G 63/18; C08G 63/68
[52] U.S. Cl. .................. 260/63 R; 96/1.5 R; 252/501; 260/47 C; 260/75 R; 260/75 S; 428/458; 428/480
[58] Field of Search ............ 260/75 R, 75 S, 47 C, 260/63 R

[56] References Cited

U.S. PATENT DOCUMENTS

| | | | |
|---|---|---|---|
| 3,162,650 | 12/1964 | Bantjes | 260/75 S X |
| 3,219,627 | 11/1965 | D'Onofrio | 260/75 R X |
| 3,271,353 | 9/1966 | Szawlowski et al. | 260/75 R X |

OTHER PUBLICATIONS

Deanin, Polymer Structure, Properties and Applications, Cahners Books, Boston, Mass. (1972), pp. 53-57.
March, Advanced Organic Chemistry: Reactions, Mechanisms, and Structure, McGraw-Hill Book Company, N.Y. (1968), pp. 37-43 & 231-233.
Oshiro et al., Chemical Abstracts, vol. 81: 106, 201d (1974).

*Primary Examiner*—Harold D. Anderson
*Assistant Examiner*—W. C. Danison, Jr.
*Attorney, Agent, or Firm*—James J. Ralabate; James P. O'Sullivan; John E. Crowe

[57] ABSTRACT

Active polymeric matrices, xerographic elements and a process for obtaining the monomer and polyester material by reacting an aldehyde of a desired polycyclic aromatic compound with a dicarboxy acid ester in the presence of a base to obtain an unsaturated dicarboxyester intermediate; cyanating the intermediate in the presence of alcohol to obtain a saturated B-cyano monocarboxy acid ester which is hydrolyzed to the $\alpha$, $\beta$ dicarboxy intermediate and then esterified to obtain the $\alpha$, $\beta$ dicarboxy ester monomer. This monomer is catalytically polymerizable with a polyhydroxy alcohol such as a glycol to obtain the polyester.

20 Claims, No Drawings

POSSIBLE ACTIVE MATRIX POLYMERS

This is a division, of application Ser. No. 401,468, filed Sept. 27, 1973 now U.S. Pat. No. 3,884,690. This invention relates to active polymeric matrix material and xerographic elements or components using such material obtained from a suitable polycyclic aromatic reactant such as a fused polycyclic aromatic aldehyde in the presence of a dicarboxyester and a glycol.

BACKGROUND OF THE INVENTION

In the electrophotographic or xerographic art it is customary to utilize photoreceptor plates having at least an external photoconductive insulating layer and a charge conductive supporting substrate. Generally, a photoconductive layer is uniformly electrostatically charged in the absence of light or other activating radiation and, thereafter, exposed to a light pattern which can correspond to a negative image. The areas of the photoconductive layer which are so exposed selectively lose their charge much more rapidly than non-exposed areas. As a result, the photoconductive layer at least temporarily retains a charge corresponding essentially to a latent positive image. This image can then be conveniently developed to form a visible positive image by contacting with oppositely charged pigmented particles commonly identified as toner particles which will adhere mostly to the charged areas. The resulting image may optionally be permanently affixed to the photoconductor if the imaging layer is not to be reused. This usually occurs with binder-type photoconductive films where the photoconductive imaging layer is also an integral part of the finished copy.

Where "plain paper" copying systems are involved, however, the latent image is conveniently developed on the imaging surface of a reusable photoconductor, or transferred to another surface such as a sheet of paper, and thereafter developed. After a latent image is developed on the imaging surface of a reusable-type photoconductor, it is transferred to another substrate and then permanently affixed by using any one of a variety of well-known techniques such as by overcoating with a transparent film, or by thermal fusion of the toner particles to the sheet. In such a copying system, the materials in the photoconductive layer must be capable of rapidly changing from an insulative to a charge-conductive and the back to an insulative condition to permit cyclic use of the imging surface. Failure to revert back to the insulative state before each succeeding charging sequence will result in a high, dark decay rate commonly referred to as "fatigue". In the past, the problem has been controlled, to some extent, simply by selection of those photoconductive materials having the best known rapid switching capacity. Typical of such materials are anthracene, poly(N-vinylcarbazole), sulfur, selenium, selenium alloys, metal-free phthalocyanines, etc., and mixtures thereof (U.S. Pat. No. 2,297,691).

While organic photoconductive materials such as poly(N-vinylcarbazole) generally have good dark decay characteristics, they generally lack sufficient inherent photosensitivity to be completely competitive with selenium. For this reason, they are usually used together with "activators". Poly(vinylcarbazoles), for example, are sensitized with 2,4,7-trinitro-9-fluorenone to obtain improved photoresponse, discharge characteristics, and even some improvement in dark decay characteristics (ref. U.S. Pat. No. 3,484,237). There are also other organic resins which are traditionally considered non-photoconductive, but which can be sensitized with Lewis Acids to form charge-transfer complexes which are photoresponsive at the visible end of the spectrum. U.S. Pat. Nos. 3,408,181; 3,408,182; 3,408,183; 3,408,184; 3,408,185; 3,408,186; 3,408,187; 3,408,188; 3,408,189; and 3,408,190 are of interest in this area.

For all practical purposes, the amount of sensitization of both photoconductive and non-photoconductive resins depends upon the concentration of the activator; within limits, the higher the loading, the greater the photoresponse obtained. Unfortunately, however, loadings exceeding about 10 weight percent of the photoconductive composition will usually impair mechanical and/or photoconductive properties of the sensitized composition. Excessive amounts of activator in either a photoconductive or a nonphotoconductive material of the type disclosed in the above patents will tend to crystallize out of the photoconductive composition.

The above inherent limitations make it very difficult and often times impossible to obtain the much-desired marriage of a high quantum efficiency photoconductor with a tough, transparent, flexible, active matrix material having a low injection threshold.

One very useful discovery in this area utilizes various protective overcoats capable of holding a charge of high field strength on an external surface and also permitting selective transmittal of holes from a photoconductive layer through the overcoat.

It is found particularly helpful in such a system if the electronically active component of the overcoat can be chemically incorporated into a soluble polymeric material of suitable toughness. Unfortunately, however, it is very difficult, if not impossible in some cases, to obtain polymeric materials having the desired molecular weight and electrical characteristics.

OBJECTS OF THE INVENTION

It is an object of the present invention to efficiently obtain polymeric materials of the above-described type having the necessary physical and electrical properties to permit a wider and more flexible use of xerographic principles for copying purposes.

It is a further object of the invention to efficiently produce and to obtain a polycyclic aromatic α,B-dicarboxy ester and corresponding polyester polymeric compounds suitable as active matrix material.

THE INVENTION

The above objects can be obtained by synthesizing and utilizing a class of polyester materials conveniently represented by the formula

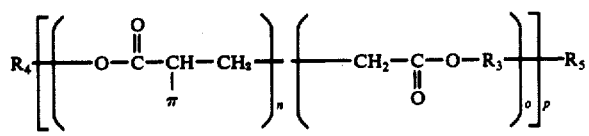

wherein
- $R_4$ and $R_5$ are individually defined as the usual polymeric end groups such as H, $CH_3$— etc;
- $n$ and $o$ are integers in a ratio of about 1–3:1
- $p$ is an integer commensurate with a number average molecular weight of about 5,000–100,000;
- $R_3$ is defined as an aryl group such as a mono- or polycyclic aromatic group (Ex. phenylene or pyrene) or as an alkylene group including methylene or a straight or branched methylene chain of from 1-20 carbon atoms, preferably 1-8 carbon atoms, such as $$-CH-\underset{\underset{CH_3}{|}}{\overset{\overset{CH_3}{|}}{C}}-CH_2- \text{ or } -(CH_2)_{\overline{n}}; \text{ and}$$

$\pi$ is defined as a polycyclic aromatic group inclusive of a fused polycyclic aromatic groups exemplified by a pyrene group, such as pyrene, 1,3,6,8-tetraphenyl pyrene, 2-phenyl pyrene, 1-acetyl pyrene, 1,2-,2,3- or 6,7-benzpyrene or 1-ethyl pyrene, etc.; as a chrysene group, inclusive of 2,3 benzochrysene; as benzanthracene group such as 1,2-benzanthracene; as a dibenzanthracene group such as 1,2,3,4- or 2,3,5,6-dibenzanthracene; as a perylene group; as a picene group; as a tetracene group; as a fluorene group; as a fluorenone group such as a nitro fluorenone; as a phenanthrene group, as an anthraquinone group and as a thiophene group such as a dibenzothiophene.

The above-defined polymers can now be obtained in good yield by contacting a reactive amount of an aldehyde of a desired polycyclic aromatic, conveniently represented by the formula $\pi$-CHO wherein the -CHO group is attached to a ring carbon, with a dicarboxy acid ester of the formula

ROOC—CH$_2$—COOR in the presence of an organic base as catalyst, to obtain an unsaturated dicarboxy ester intermediate;

cyanating the unsaturated dicarboxy ester intermediate in the presence of an alcohol with at least an equimolar amount of KCN or HCN to obtain the corresponding saturated B-cyano substituted monocarboxy acid ester;

hydrolyzing the B-cyano substituted monocarboxy acid ester to obtain an $\alpha$, B-dicarboxy intermediate of the formula $$\pi-\underset{\underset{COOH}{|}}{\overset{\overset{H}{|}}{C}}-CH_2-COOH; \text{ and then}$$

esterfying said $\alpha,\beta$-dicarboxy intermediate to obtain the corresponding $\alpha, \beta$-dicarboxy ester monomer.

The above-described ester monomer is then reacted, as desired, under vacuum with a reactive amount of a poly hydroxy alcohol such as a glycol, optionally in the presence of a polymerization catalyst such as a titanate salt (Ex. disodium hexabutyl titanate) to obtain the final polyester product.

Glycols of this type are conveniently represented by the formula:

$$OH-R_3-OH \tag{IA}$$

wherein $R_3$ is defined as above with respect to formula I.

The overall reaction is conveniently exemplified by the following general equations:

$$\text{(II)} \quad \pi CHO + \text{(III)} \underset{\underset{COOR}{|}}{\overset{\overset{COOR}{|}}{CH_2}} \xrightarrow[\text{benzene}]{\text{Basic Cat.}} \text{(IV)} \quad \pi-CH=\underset{\underset{COOR}{|}}{\overset{\overset{COOR}{|}}{C}}$$

$$\downarrow \overset{KCN}{\underset{\text{Et. OH}}{}}$$

$$\text{(VI)} \quad \pi-\underset{\underset{COOH}{|}}{\overset{\overset{H}{|}}{C}}-CH_2-COOH \xleftarrow{H^+} \text{(V)} \quad \pi-\underset{\underset{CN}{|}}{\overset{\overset{H}{|}}{C}}-CH_2-\overset{COOR}{|}$$

reflux $$\downarrow \overset{R_2OH}{\underset{HCl}{}}$$

$$\text{(VII)} \quad \pi-CH-CH_2-COOR \atop \quad \quad \underset{COOR_2}{|}$$

(THE MONOMER).

wherein R and R$_2$ are individually and separately defined at each occurrence as an alkyl group and preferably defined as a lower alkyl group of 1-8 carbon atoms such as methyl, isopropyl or octyl; and $\pi$ is defined as above.

The $\alpha, \beta$-dicarboxy ester of formula VII is converted, as desired, to the polyester by reacting with the poly hydroxy alcohol represented by formula (IA) in the presence of a suitable polymerization catalyst such as a titanate salt, an antimony oxide or a lead oxide, with heating. The reaction can be conveniently carried out, for instance, at a temperature of about 185° C–250° C.

As a matter of preference, the initial reaction of the aldehyde (II) with the dicarboxyester (III) is best carried out with an organic solvent such as benzene in the presence of a few drops of organic base such as piperidine or pyrimidine under reflux conditions. This reaction should be allowed to run for about 10–30 hours to obtain the best yield of the unsaturated diester intermediate (formula IV).

The isolated intermediate is then best converted to the saturated $\beta$-cyano monocarboxy ester (formula V) by cyanating with KCN or HCN under reflux conditions in an alcohol such as methanol or ethanol. For this purpose, a 10–20 hour reflux in ethanol is preferred.

Hydrolysis of the compound of formula I is conveniently carried out with HCl - ethanol in the usual manner to obtain the α, β-dicarboxyester monomer (formula VI), and esterification is effected with an alcohol and HCl or $H_2SO_4$ in the usual manner.

The subsequent polymerization reaction is most conveniently, although not exclusively, carried out under vacuum in the presence of a catalytic amount. (.001 - .015 mole) of disodium hexabutyl titanate at a temperature of about 200°-240° C.

The resulting product is a clear, film forming material soluble in varying amounts in THF or chloroform depending upon the molecular weight and the polycyclic moieties involved.

Suitable monomers and corresponding polyesters obtainable within the scope of the present invention are set forth, for instance, in Table I below.

TABLE I

| Polymer | π-CHO | Glycol Reactant | Ratio n:o | MW (number average) |
|---------|-------|-----------------|-----------|---------------------|
| A* | 1-pyrene*** carboxaldehyde | ethylene glycol | 1:1 | 10,000 |
| B* | " | " | 1:1 | 20,000 |
| C* | 1-pyrene 6-methyl carboxaldehyde | " | 1:1 | 40,000 |
| D** | 1,2-benzanthracene | 1,6-di(hydroxymethyl) pyrene | 3:1 | 5,000 |
| E** | 1-pyrene carboxaldehyde | 1,3-butanediol | 1:1 | 100,000 |
| F** | 1-chrysene carboxaldehyde | p-hydroxyphenol | 3:1 | 15,000 |

*5 drops of piperdine in 1 liter of benzene/inital reaction stepand .001 mole of disodium hexabutyl titanate in the finalpolymerization step.
**5 drops pyrimidine in benzene/initial reaction step and .001 moledisodium hexabutyl titanate in the final polymerization step.
***prepared from pyrene by the Vilsmeier reaction.

EXAMPLE I (Polymer B)

About 0.5 mole of 1-pyrene-monocarboxy aldehyde is dissolved in benzene and slowly admixed with about .5 mole of dimethyl malonate plus 5 drops of piperdine and refluxed for 30 hours. The resulting dimethyl pyrenal malonate intermediate is then recovered and purified by recrystallization from ethanol and admixed with about 0.5 mole excess of KCN in 500 ml. of ethanol. The mixture is refluxed for 18 hours to obtain the ethyl B-pyrenal-B-cyano-propionate intermediate. This intermediate is then hydrolyzed, isolated, esterified with ethanol and HCl in the usual manner.

The resulting purified pyrenal succinic acid monomer is found to contain about 60% by weight of the pyrene. The monomer is then admixed with ethylene glycol at 240° C. under vaccuum in the presence of .001 mole disodium hexa 2-butyl titanate to obtain the polymeric product. This product is removed and purified and identified as a polyester having a molecular weight of about 15,000. This product is identified as "B" and tested (ref. Tables I and II).

EXAMPLE II

Two test strips are prepared consisting of an aluminum foil substrate, a .5 μ vacuum deposited selenium alloy photoconductive layer applied thereto and a polymeric overcoat obtained by casting a 50:50 THF solution of polymers "B" and "C" (Table I) obtained in accordance with the process of Example I. The test strips are then dried and tested in the usual way for electronic properties. These strips are identified as T-1 and T-2 and reported in Table II below.

EXAMPLE III

A control strip identified as C-1 is prepared identically with those of Example II except that a vinyl acetate/PVA copolymer (1:4) overcoat having a number average molecular weight of about 40,000 utilized. The results are reported in Table II below.

TABLE II

| # | Polymer | Overcoat | Surface Potential (volt) | PC Discharge v/sec$^{-1}$* | Dark Decay |
|---|---------|----------|--------------------------|--------------------------|------------|
| T-1 | B | 10μ | +810 | 550 | 5% |
| T-2 | C | 10μ | +810 | 500 | 4% |
| C-1 | PVAc/PVA (1:4) | 10μ | +810 | ** | ** |

*measured after exposure for 10 seconds with a 200 watt tungsten-iodine lamp at 15 cm.
**negligable amount.

While the invention has been particularly shown and desired with respect to preferred embodiments thereof, it will be understood that variations in form may be made therein without departing from the spirit and scope of the invention.

What is claimed is:

1. A polyester material of the formula

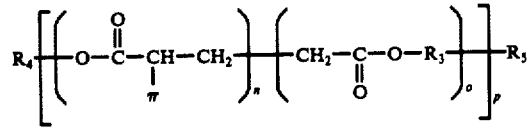

wherein
- π is defined as pyrene, tetraphenylpyrene, phenylpyrene, acetylpyrene, benzpyrene, alkylpyrene, chrysene, benzochrysene, benzathracene, dibenzathracene, perylene, picene, tetracene, fluorene, fluorenone, nitrofluoroenone, phenanthrene, anthraquinone, thiophene or dibenzothiophene radicals;
- $R_3$ is defined as divalent aromatic hydrocarbon radical or as a straight or branched methylene chain of from 1-20 carbon atoms;
- $R_4$ and $R_5$ are individually defined as low molecular weight aliphatic polymeric end groups;
- n and o are integers in a ratio of about 1-3:1; and
- p is an integer commensurate with a number average molecular weight of about 5,000 - 100,000.

2. The polyester material of claim 1, wherein $R_3$ is defined as a straight or branched polymethylene chain of 2 - 20 carbons; and the ratio of $n$-to-$o$ is about 1:1.

3. The polyester material of claim 1 wherein $R_3$ is a divalent polycyclic aromatic hydrocarbon group; and the ratio of $n$-to-$o$ is about 3:1.

4. The polyester material of claim 1 wherein $\pi$ is a pyrene radical.

5. The polyester of claim 1 wherein $\pi$ is a chrysene radical.

6. The polyester of claim 1 wherein $\pi$ is a dibenzanthracene radical.

7. The polyester of claim 1 wherein $\pi$ is a fluorenone radical.

8. The process of claim 14, wherein polymerization is effected in the presence of disodium hexabutyl titanate at a temperature of about 185° - 250° C.

9. The process of claim 8 wherein $\pi$ is defined as a chrysene group.

10. The process of claim 8 wherein $\pi$ is defined as a dibenzanthracene group.

11. The process of claim 8 wherein $\pi$ is defined as a fluorenone group.

12. The process of claim 8 wherein $\pi$ is defined as a perylene group.

13. The polyester of claim 2 wherein $R_3$ is an ethylene group.

14. A process for obtaining a polyester comprising contacing a reactive amount of a diester of the formula:

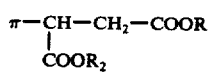

wherein
$\pi$ is defined as pyrene, tetraphylpyrene, phenylpyrene, acetylpyrene, benzyoyrene, alkylpyrene, chrysene, benzochrysene, benzathracene, dibenzathracene, perylene, picene, tetracene, fluorene, fluorenone, nitrofluorenone, phenanthrene, anthroquinone, thiophene or dibenzothiophene radicals;

R and $R_2$ are individually and separately defined at each occurrence as an alkyl group, with a polyhydroxy alcohol of the formula:

wherein $R_3$ is defined as an aromatic hydrocarbon or an alkylene radical;
effecting the reaction with heat in the presence of a polymerization catalyst.

15. A process for obtaining a polyester comprising contacting a reactive amount of diester of the formula:

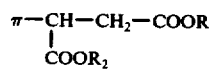

wherein
$\pi$ is defined as pyrene, methylpyrene, 1,2-benzathracene or chrysene radicals; and R and $R_2$ are individually and separately defined at each occurrence as a lower alkyl group; with a polyhydroxy alcohol of the formula:

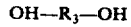

wherein $R_3$ is defined as an alkylene group; and effecting the reaction with heat in the presence of a polymerization catalyst.

16. The process of claim 15 wherein $\pi$ is defined as the pyrene radical.

17. The process of claim 15 wherein $\pi$ is defined as the methylpyrene radical.

18. The process of claim 15 wherein $\pi$ is defined as the 1,2-benzanthracene radical.

19. The process of claim 15 wherein $\pi$ is defined as the chrysene radical.

20. The process of claim 15 wherein polymerization is effected in the presence of disodium hexabutyl titanate at a temperature of about 185° - 250° C.

* * * * *